United States Patent
Hong

(10) Patent No.: US 6,550,730 B1
(45) Date of Patent: Apr. 22, 2003

(54) RETAINING DEVICE FOR REPLACEABLE HANGER FRAME

(76) Inventor: Yi-Fa Hong, 235 Chung-Ho Box, 8-24 Taipei (TW)

( * ) Notice: Subject to any disclaimer, the term of this patent is extended or adjusted under 35 U.S.C. 154(b) by 0 days.

(21) Appl. No.: 10/053,999

(22) Filed: Jan. 24, 2002

(51) Int. Cl.[7] ................................................ A47B 96/06
(52) U.S. Cl. .................... 248/219.4; 211/187; 403/164; 403/188; 108/147.13
(58) Field of Search ............................. 248/219.4, 127, 248/146, 158, 224.7; 211/187, 188; 108/147.2, 147.13, 147.15, 144.11, 106, 107, 110, 134; 403/187, 188, 52, 164

(56) References Cited

U.S. PATENT DOCUMENTS

| | | | | |
|---|---|---|---|---|
| 6,044,988 A | * | 4/2000 | Yang | 108/107 |
| 6,068,143 A | * | 5/2000 | Wang | 108/144.11 |
| 6,079,575 A | * | 6/2000 | Wang | 108/110 |
| 6,357,611 B1 | * | 3/2002 | Chen | 108/107 |
| 6,364,139 B1 | * | 4/2002 | Chen | 108/107 |

* cited by examiner

Primary Examiner—Ramon O. Ramirez

(57) ABSTRACT

A retaining device for a replaceable hanger frame comprises a main supporting post and a retainer. The retainer encloses the main supporting post, and a buckle sleeve in the enclosing sleeve. A lower end of an inner surface of the enclosing sleeve is installed with a cambered groove. The buckle sleeve is formed by two opposite wave-like cambered sheets which are assembled to the interior of the enclosing sleeve. The wave-like cambered sheet of the buckle sleeve is installed with a plurality of stop ribs. The wave-like cambered sheets have outer tips which resist against the enclosing sleeve. A concave space formed on the outer surface of the buckle sleeve and an inner surface of the enclosing sleeve provides a margin for compressing and deformation as the main supporting post is engaged. Thereby, the enclosing sleeve and buckle sleeve are positioned to a predetermined position of the main supporting post.

5 Claims, 8 Drawing Sheets

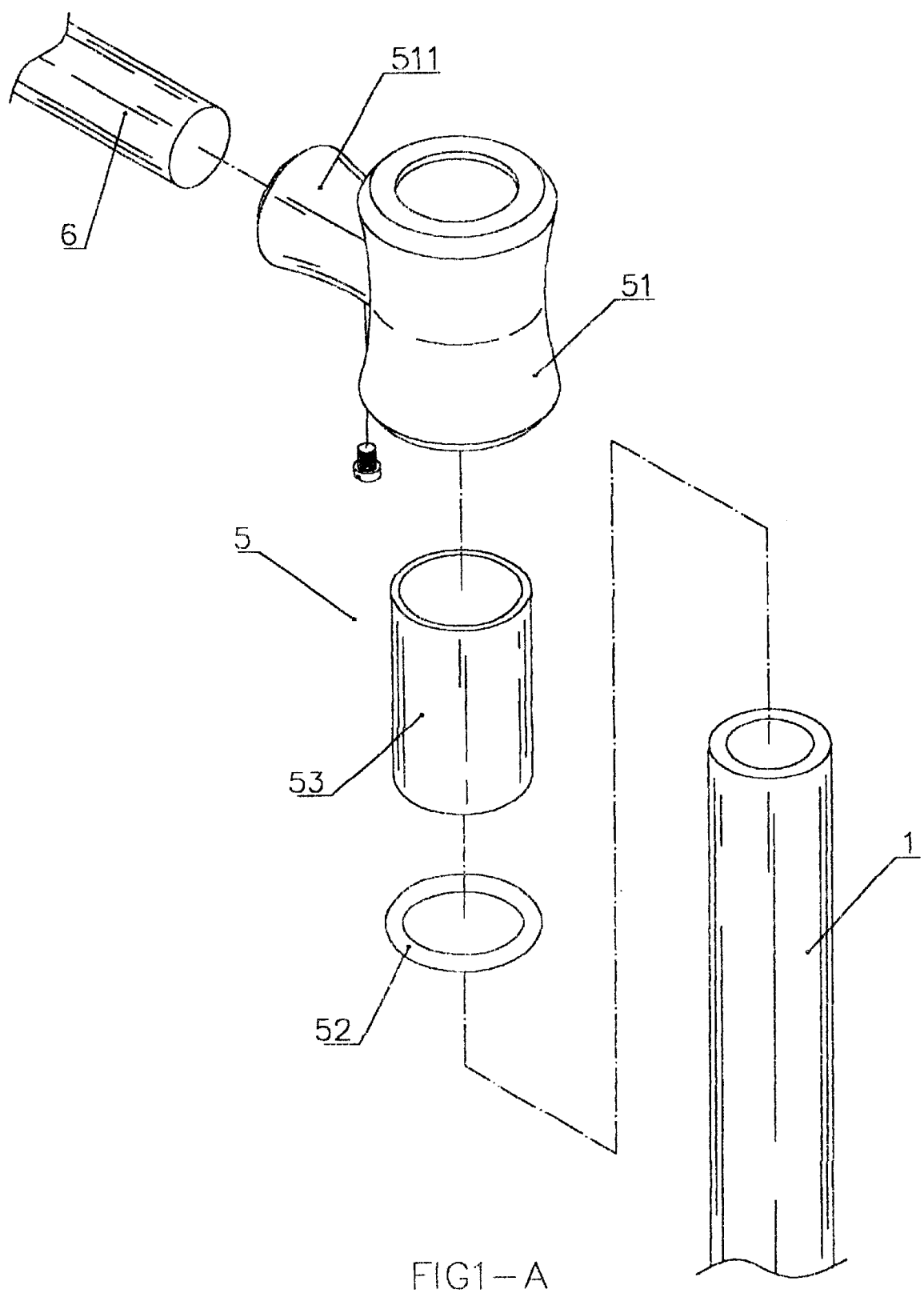
FIG1-A

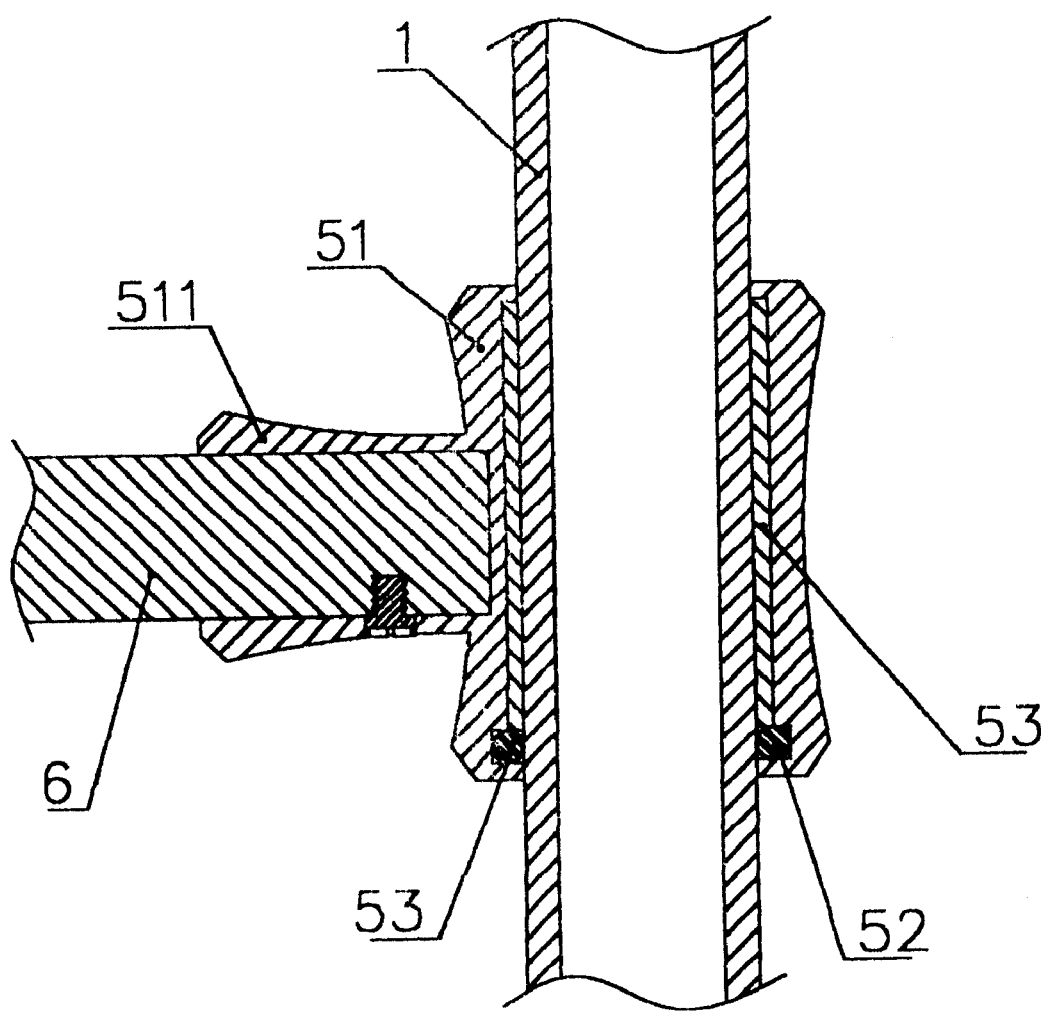
FIG1-B

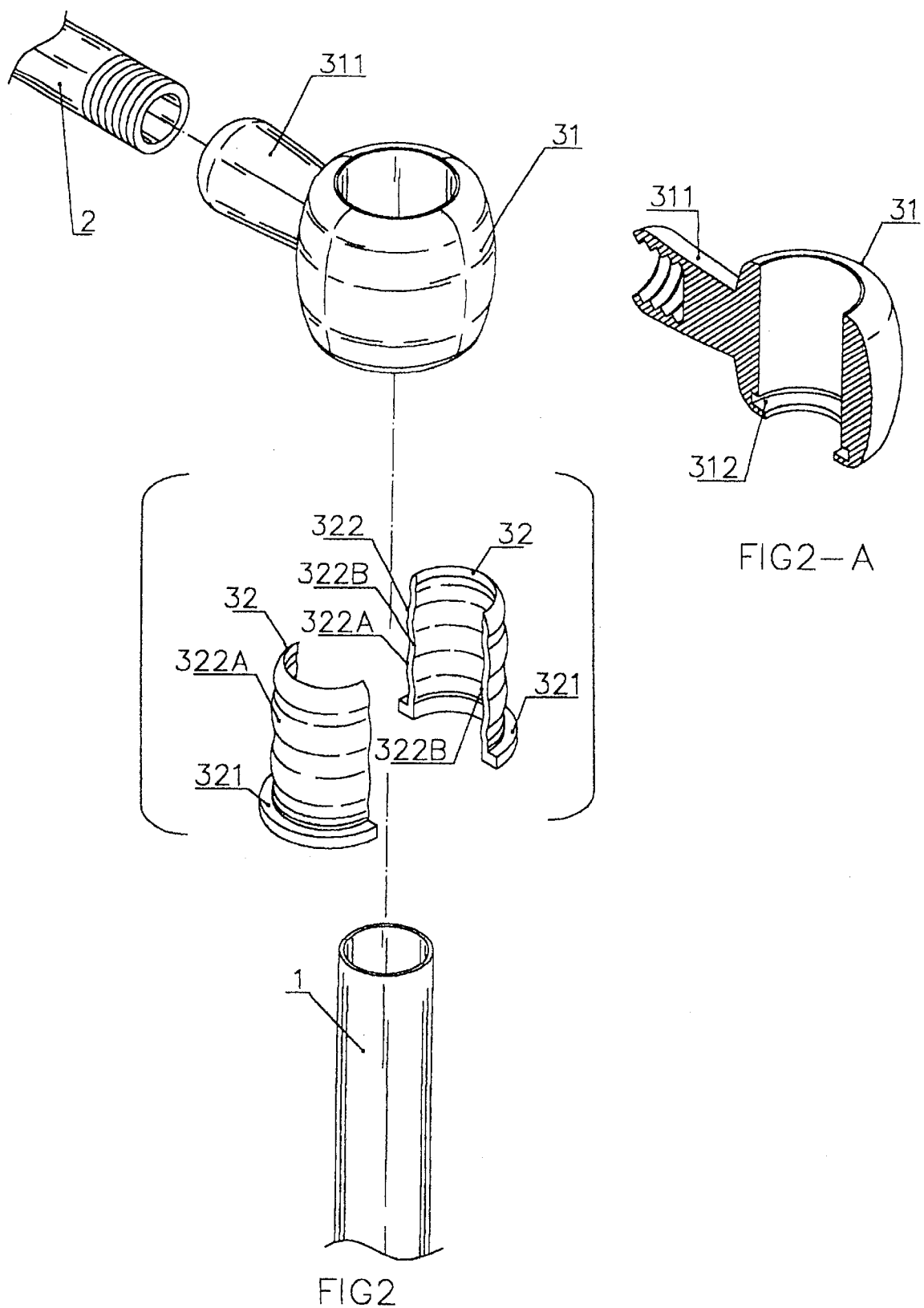

RETAINING DEVICE FOR REPLACEABLE HANGER FRAME

BACKGROUND OF THE INVENTION

1. Field of the Invention

The present invention relates to retaining devices, and particularly to a retaining device for a replaceable hanger frame.

2. Description of Related Art

Referring to FIG. 1, the retainer 5 for positioning a main supporting post 1 and a hanger frame 6 is illustrated. A plurality of sleeves 51 encloses the main supporting post 1. The lateral side of the sleeve 51 is installed with a lateral tube 511. The hanger frame 6 is inserted into the lateral tube 511. The inner bottom of the sleeve 51 is embedded with an O ring. The upper side of the O ring serves for confining a plastic inner tube 53. Since the O ring tightly resists against the main supporting post 1, the plastic inner tube 53 and the sleeve 51 are positioned to the main supporting post 1 for positioning the hanger frame 6.

The retainer 5 is not so good as the user's anticipation since in the retainer 5 for positioning the hanger frame 6, the O ring 52 and the plastic inner tube 53 are utilized to position the sleeve 51. As a result, the plastic inner tube 53 must be made of hard materials and tightly resist against the main supporting post 1 so that the plastic inner tube 53 and the sleeve 51 are positioned to the main supporting post 1. Thereby, the hanger frame 6 is positioned. The friction force is finite due to the contact between the whole inner surface thereof and the main supporting post 1. If the objects hung on or suspended from the hanger frame 6 is light. The retainer 5 is sufficient to support the weight of the object. If the object is heavy, the connecting force of the O ring and the plastic inner tube is smaller than the weight of the object so that the retainer will slide down since it is pulled by the object.

SUMMARY OF THE INVENTION

Accordingly, the primary object of the present invention is to provide a retaining device for a replaceable hanger frame which comprises a main supporting post installed at a base and a retainer installed at the main supporting post. The retainer is formed by a copper-made enclosing sleeve enclosing the main supporting post, and a buckle sleeve in the enclosing sleeve. A circular surface of the enclosing sleeve is protruded with a locking seat. The locking seat is locked with a hanger rod. A lower end of an inner surface of the enclosing sleeve is installed with a cambered groove. The buckle sleeve is formed by two opposite wave-like cambered sheets which are assembled to two sides of the enclosing sleeve. The wave-like cambered sheet of the buckle sleeve is installed with a plurality of stop ribs. The wave-like cambered sheet has outer tips at an outer surface thereof Each outer tip resists against an inner surface of the enclosing sleeve. The wave-like cambered sheet has inner tips at an inner surface thereof. Each inner tip resists against an annular surface of the main supporting post as the buckle sleeve is buckled to the main supporting post. A concave space formed on the outer surface of the buckle sleeve and an inner surface of the enclosing sleeve provides a margin for compressing and deformation as the main supporting post is engaged. Thereby, the enclosing sleeve and buckle sleeve are positioned to a predetermined position of the main supporting post.

The various objects and advantages of the present invention will be more readily understood from the following detailed description when read in conjunction with the appended drawing.

BRIEF DESCRIPTION OF THE DRAWINGS

FIG. 1-A is an exploded perspective view of the prior art.

FIG. 1-B is a plane cross sectional view of the prior art.

FIG. 2 is an exploded perspective view of the present invention.

FIG. 2-A is a cross sectional view of the enclosing sleeve of the present invention.

DETAILED DESCRIPTION OF THE PREFERRED EMBODIMENTS

Figure 3:
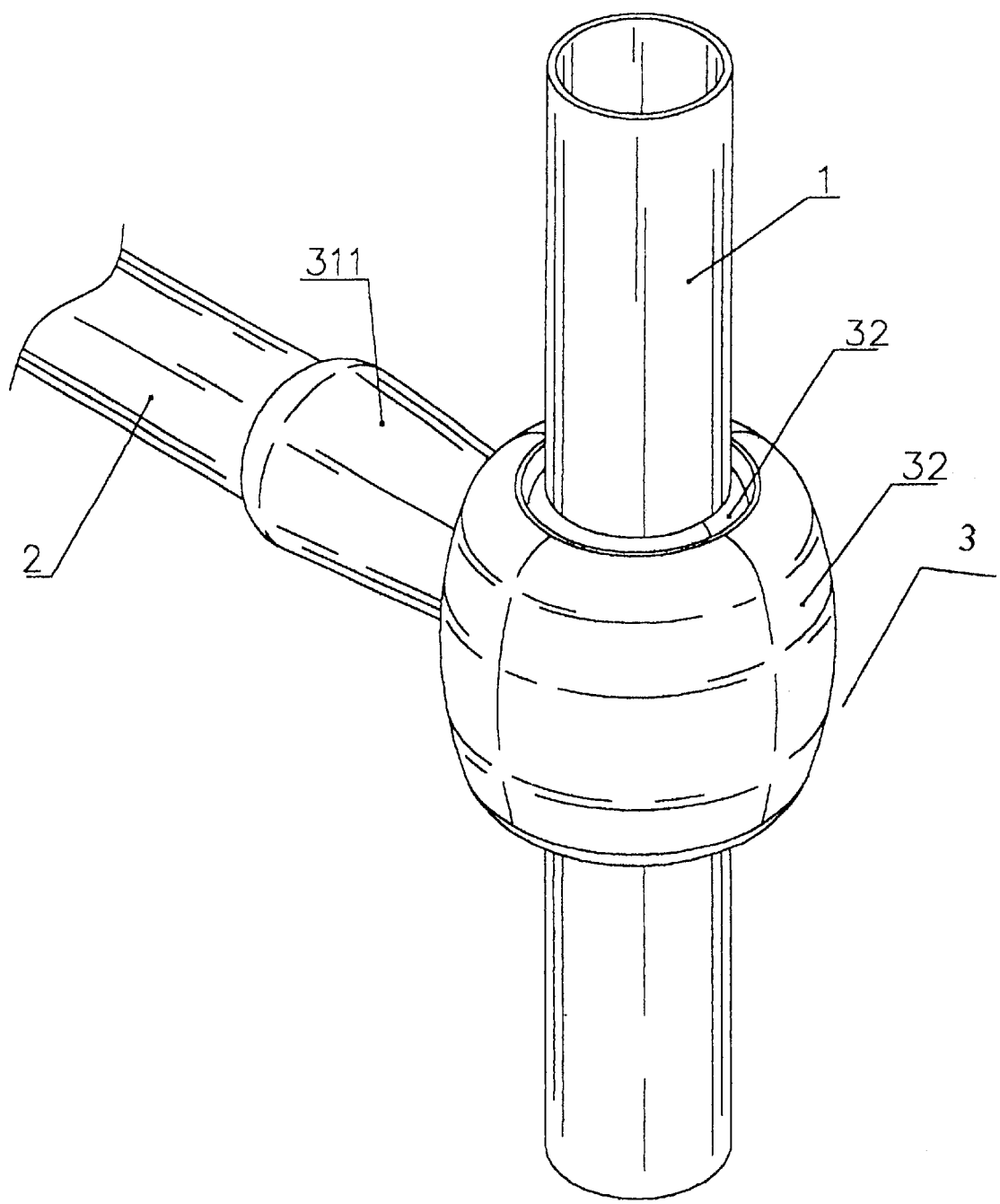
FIG. 3 is an assembled perspective view of the present invention.

Referring to FIG. 3, the structure of the present invention is clearly illustrated. The retaining device for a replaceable hanger frame of the present invention includes a main supporting post 1 installed at a base and plurality of hang rods 2 assembled to the main supporting post 1. The hanger rod 2 is assembled to a main supporting post 1 by a retainer 3.

The retainer 3 is formed by a copper-made enclosing sleeve 31 of the main supporting post 1, and a buckle sleeve 32 in the enclosing sleeve 31. A circular surface of the enclosing sleeve 31 is protruded with a locking seat 311. The locking seat 311 is locked with a hanger rod 2 for hanging toilet papers or stool brushes, etc. A bottom of the inner surface of the enclosing sleeve 31 is installed with a cambered groove 312 for positioning the buckle sleeve 32.

The buckle sleeve 32 is formed by two opposite rubber cambered sheets which are assembled at the interior of the enclosing sleeve 31. The buckle sleeve 32 is engaged with the cambered groove 312 of the enclosing sleeve 3. The buckle sleeve 32 has a flange 321 which is buckled with the cambered groove 312. Thereby, the buckle sleeve 32 is engaged with the enclosing sleeve 31. The buckle sleeve 32 has wave-like cambered sheet 322 at inner and outer sides. The wave-like cambered sheet 322 has outer tips 322A at the outer surface thereof. Each outer tip 322A resists against the inner surface of the enclosing sleeve 31. The wave-like cambered sheet 322 has inner tips 322B at the outer surface thereof. Each inner tip 322B resists against the annular surface of the main supporting post 1 as the buckle sleeve 32 is buckled to the main supporting post 1. The concave space 323 formed by outer surface of the buckle sleeve 32 and the enclosing sleeve 31 provides a margin for compressing and deformation as the main supporting post 1 is engaged. Thereby, the main supporting post 1 can be installed easily.

Figure 4:
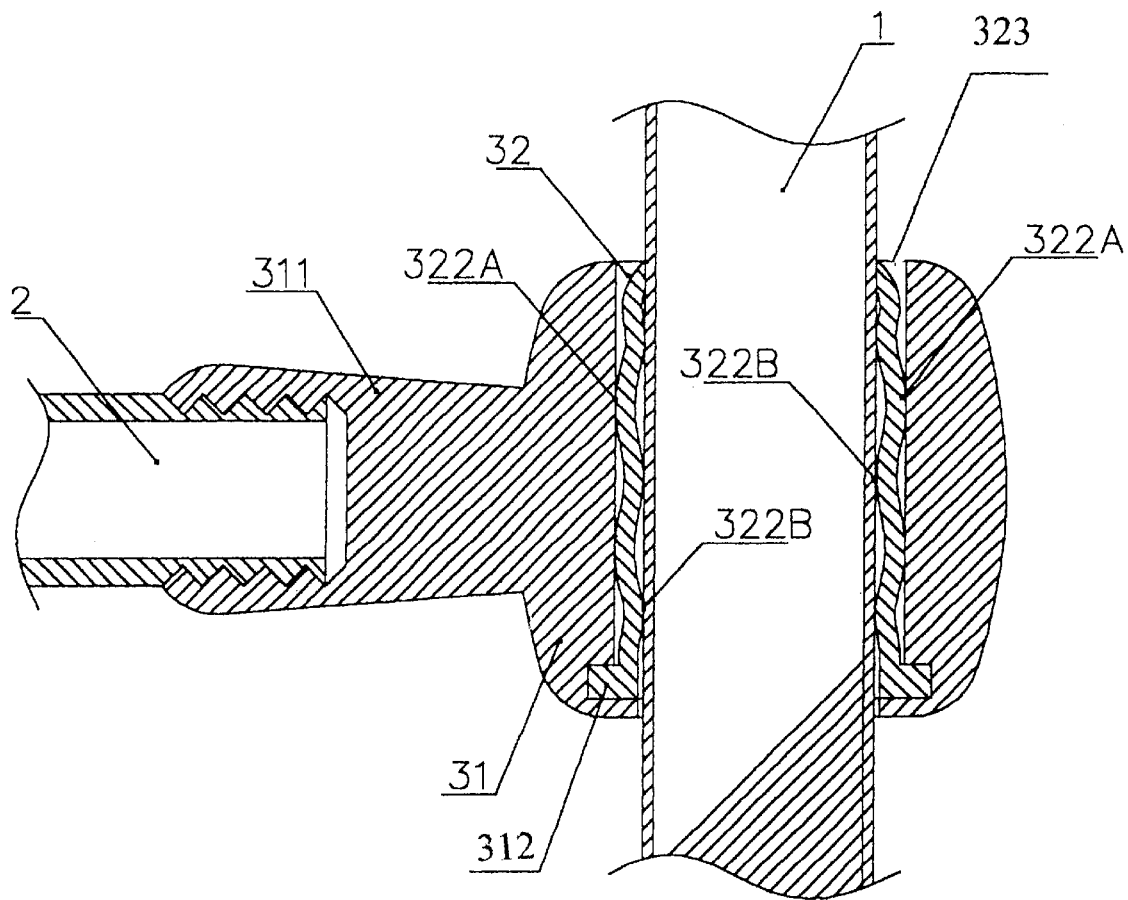
FIG. 4 is a plane cross sectional view of the present invention.

Referring to FIG. 4, a plane cross sectional view of the present invention is illustrated. The cambered groove 312 of the enclosing sleeve 31 is buckled with the flange 321 of the buckle sleeve 32. Then the enclosing sleeve 31 and buckle sleeve 32 are buckled with the main supporting post 1 so that the buckle sleeve 32 is confined by the enclosing sleeve 31 to compress the main supporting post 1. Thereby, the wave-like cambered sheet 322 of the buckle sleeve 32 deforms in the concave space 323 as the buckle sleeve 32 is assembled. Then, the wave-like cambered sheet 322 tightly resists against the surface of the main supporting post 1. Thus, the buckle sleeve 32 and the enclosing sleeve 31 are tightly positioned on a predetermined portion of the main supporting post 1. Thereby, a retaining device for a replaceable hanger frame of the present invention is achieved.

Figure 5:
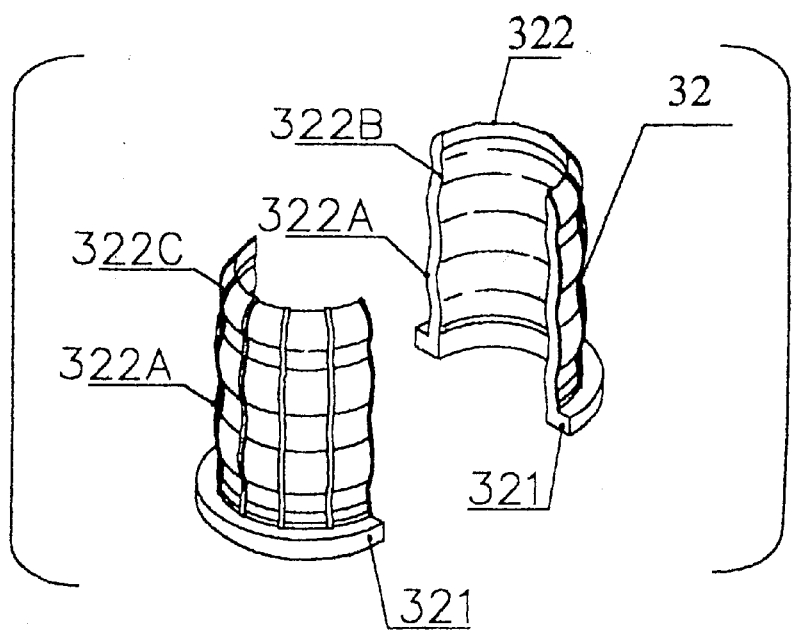
FIG. 5 shows another embodiment of the present invention.
Figure 6:
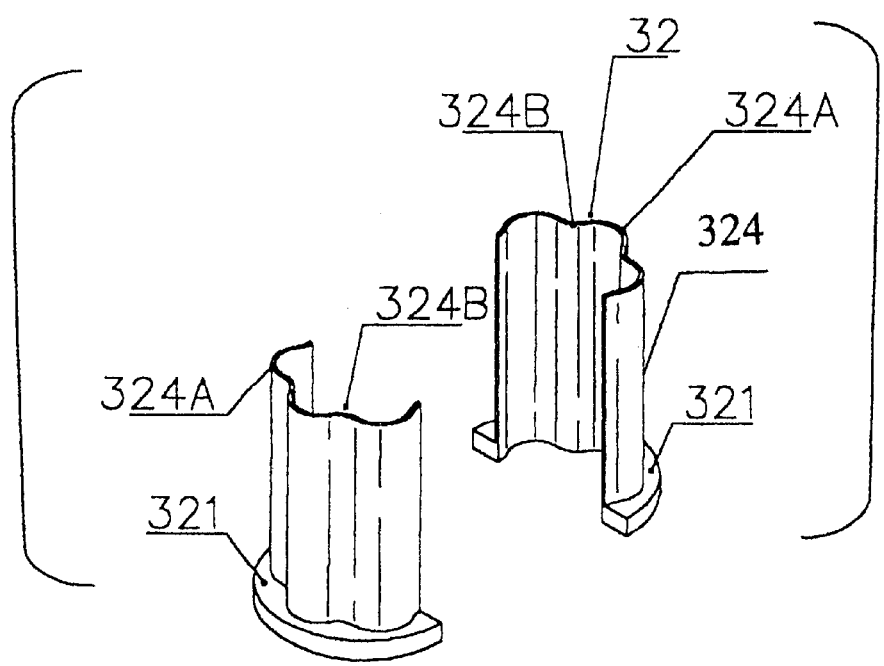
FIG. 6 shows the third embodiment of the present invention.

With reference to FIGS. 5 and 6, another two embodiments of the present invention are illustrated. The wave-like cambered sheet 322 of the buckle sleeve 32 is installed with a plurality of stop ribs 322C (referring to FIG. 5). When the buckle sleeve 32 is tightly combined with the enclosing sleeve 31, the outer ends of the stop ribs 322C resist against the outer surface of the main supporting post 1. The wave-like cambered sheet 322 of the buckle sleeve 32 has wave-like surface 324 with straight textures (referring to FIG. 6). The inner and outer tips 324A and 324B of the wave-like surface 324 resist against the outer surface of the main supporting post 1 and the inner surface of the enclosing sleeve 31.

Figure 7:
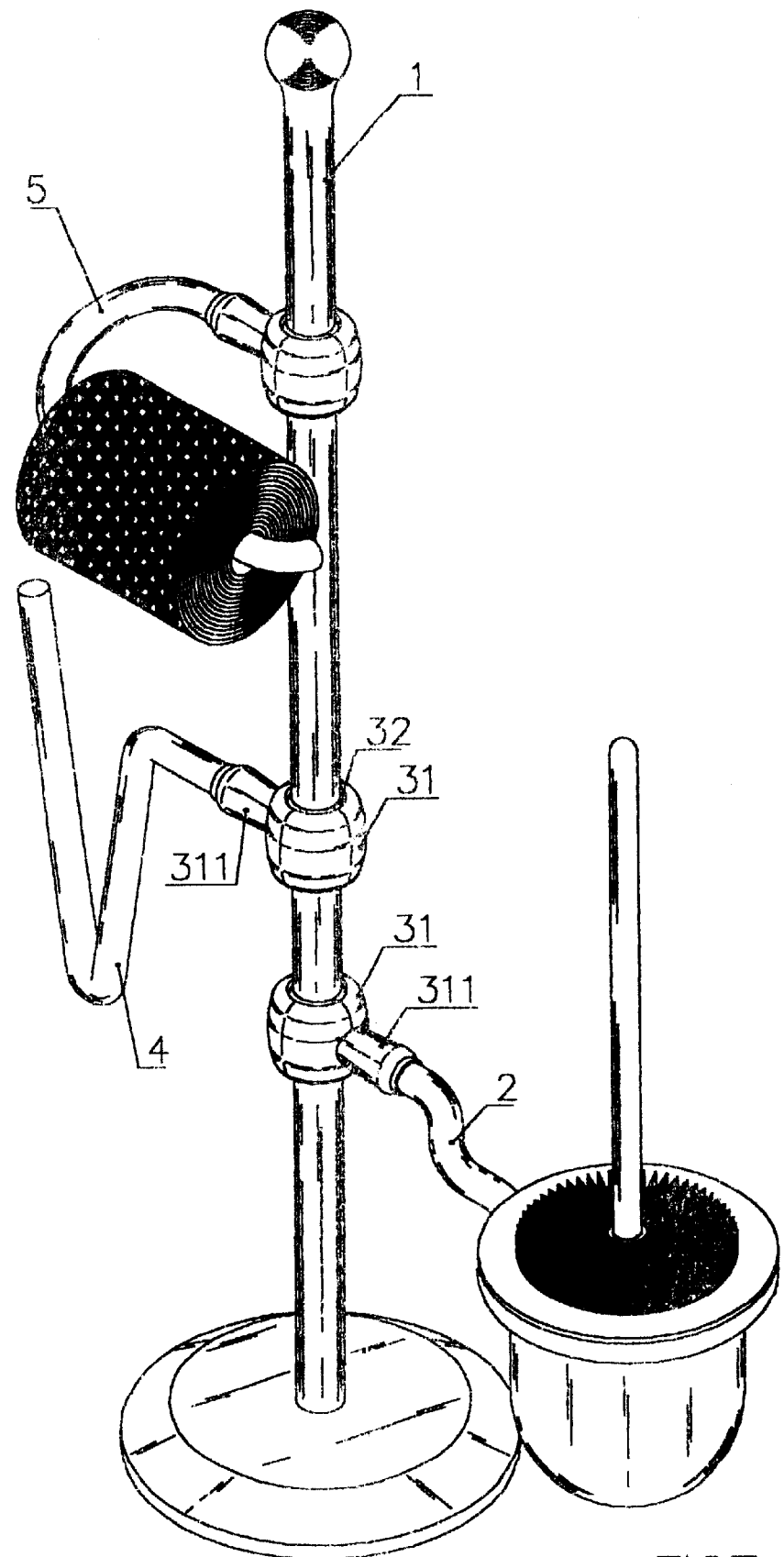
FIG. 7 shows one embodiment about the installation of the present invention.
Figure 8:
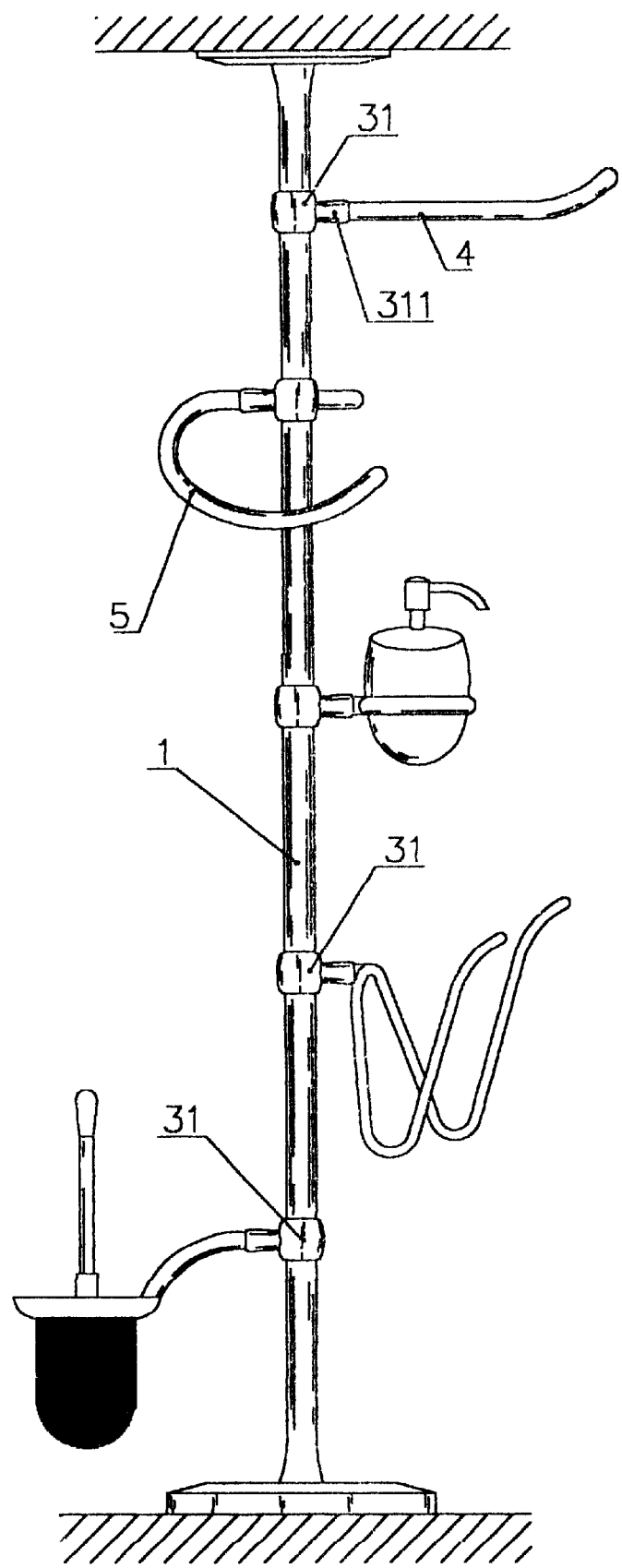
FIG. 8 shows another embodiment about the installation of the present invention.

Referring to FIGS. 7 and 8, the stand-type and wall-type retaining device for a replaceable hanger frame are shown. The number of the retainer 3 can be added as desired. The upper end of the main supporting post 1 is formed with various types of hanger rods 2 for hanging articles.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A retaining device for a replaceable hanger frame comprising a main supporting post installed at a base and at least one retainer installed at the main supporting post; the retainer being formed by an enclosing sleeve and a buckle sleeve in the enclosing sleeve; the enclosing sleeve being made of copper and enclosing the main supporting post; a surface of the enclosing sleeve is protruded with a locking seat; the locking seat is locked with a hanger rod, characterized in that:

a lower end of an inner surface of the enclosing sleeve is installed with a cambered groove, the buckle sleeve is formed by two opposite wave-like cambered sheets which are assembled to inner side of the enclosing sleeve; each wave-like cambered sheet of the buckle sleeve is installed with a plurality of stop ribs; the wave-like cambered sheet have outer tips at an outer surface thereof; each outer tip resists against an inner surface of the enclosing sleeve; the wave-like cambered sheet has inner tips at an inner surface thereof; each inner tip resists against an annular surface of the main supporting post as the buckle sleeve is buckled to the main supporting post; a concave space formed on the outer surface of the buckle sleeve and an inner surface of the enclosing sleeve provides a margin for compressing and deformation as the main supporting post is engaged; thereby, the enclosing sleeve and buckle sleeve are positioned to a predetermined position of the main supporting post.

2. The retaining device for a replaceable hanger frame as claimed in claim 1, wherein said at least one retainer is a plurality of retainers; and an upper end of the main supporting post is formed with various types of hanger rods for hanging articles.

3. The retaining device for a replaceable hanger frame as claimed in claim 1, wherein the buckle sleeve is made of rubber.

4. The retaining device for a replaceable hanger frame as claimed in claim 1, wherein an outer surface of the buckle sleeve is formed with a flange at position corresponding to and the cambered groove of the enclosing sleeve.

5. The retaining device for a replaceable hanger frame as claimed in claim 1, wherein when the buckle sleeve is tightly combined with the enclosing sleeve, outer ends of the stop ribs resist against the outer surface of the main supporting post.

* * * * *